United States Patent
Wang et al.

(10) Patent No.: US 11,226,284 B2
(45) Date of Patent: Jan. 18, 2022

(54) SPECTROMETER AND MICRO-TOTAL ANALYSIS SYSTEM

(71) Applicant: BOE TECHNOLOGY GROUP CO., LTD., Beijing (CN)

(72) Inventors: Fangzhou Wang, Beijing (CN); Wei Wang, Beijing (CN); Xianqin Meng, Beijing (CN); Xiaochuan Chen, Beijing (CN); Xiandong Meng, Beijing (CN); Pengxia Liang, Beijing (CN); Qiuyu Ling, Beijing (CN); Peilin Liu, Beijing (CN); Yishan Tian, Beijing (CN); Yujiao Guo, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/765,025

(22) PCT Filed: Oct. 22, 2019

(86) PCT No.: PCT/CN2019/112493
§ 371 (c)(1),
(2) Date: May 18, 2020

(87) PCT Pub. No.: WO2020/083274
PCT Pub. Date: Apr. 30, 2020

(65) Prior Publication Data
US 2020/0363321 A1    Nov. 19, 2020

(30) Foreign Application Priority Data
Oct. 23, 2018  (CN) .......................... 201811237706.4

(51) Int. Cl.
*G01N 21/25*    (2006.01)
(52) U.S. Cl.
CPC .................................. *G01N 21/255* (2013.01)

(58) Field of Classification Search
None
See application file for complete search history.

(56) References Cited

U.S. PATENT DOCUMENTS

| 5,446,534 A * | 8/1995 | Goldman | G01J 3/0259 |
|---|---|---|---|
| | | | 356/128 |
| 5,630,004 A | 5/1997 | Deacon et al. | |

(Continued)

FOREIGN PATENT DOCUMENTS

| CN | 1164898 A | 11/1997 |
|---|---|---|
| CN | 101151562 A | 3/2008 |

(Continued)

OTHER PUBLICATIONS

Austin Hsiao et al., "Colorimetric plasmon resonance microfluidics on nanohole array sensors", Sensing and Bio-Sensing Research 5 (2015), pp. 24-32 (9 pages).

(Continued)

*Primary Examiner* — Shawn Decenzo
(74) *Attorney, Agent, or Firm* — Collard & Roe, P.C.

(57) ABSTRACT

A spectrometer and a micro-total analysis system are provided. The spectrometer includes a waveguide structure, a light source, a collimating mirror, a reflection grating, and a light extraction structure. The collimating mirror is configured to convert light, which is emitted from the light source, passes through the waveguide structure, and is incident on the collimating mirror, into collimating light. The reflection grating is configured to allow emergency angles of light of different wavelength ranges among the collimating light incident on the reflection grating to be different, so that the light of different wavelength ranges has an offset in the total reflection propagation process. The light extraction structure is located on the reflection surface of the waveguide structure through which the light of different wavelength ranges (Continued)

passes in the total reflection propagation process, so that the light of different wavelength ranges emits from the light extraction structure.

19 Claims, 3 Drawing Sheets

(56) References Cited

U.S. PATENT DOCUMENTS

| | | | | |
|---|---|---|---|---|
| 6,303,934 | B1* | 10/2001 | Daly | G01J 3/02 |
| | | | | 250/339.02 |
| 7,573,640 | B2 | 8/2009 | Nivon et al. | |
| 2004/0119017 | A1* | 6/2004 | Lee | G01J 3/2823 |
| | | | | 250/339.12 |
| 2009/0040580 | A1* | 2/2009 | Mukawa | G02B 27/0944 |
| | | | | 359/15 |
| 2009/0091754 | A1* | 4/2009 | Zhang | G01J 3/0291 |
| | | | | 356/326 |
| 2015/0168213 | A1* | 6/2015 | Dimov | G01J 3/2823 |
| | | | | 356/328 |
| 2016/0265974 | A1* | 9/2016 | Ertel | G01J 3/0291 |
| 2018/0202928 | A1 | 7/2018 | Abdulhalim | |
| 2019/0094445 | A1 | 3/2019 | Meng et al. | |
| 2019/0178714 | A1* | 6/2019 | Faraji-Dana | G02B 5/1847 |
| 2019/0368931 | A1* | 12/2019 | Grueger | G01J 3/18 |
| 2020/0108387 | A1 | 4/2020 | Dong et al. | |

FOREIGN PATENT DOCUMENTS

| | | |
|---|---|---|
| CN | 103245996 A | 8/2013 |
| CN | 103995354 A | 8/2014 |
| CN | 104792418 A | 7/2015 |
| CN | 105510243 A | 4/2016 |
| CN | 107607475 A | 1/2018 |
| CN | 107621673 A | 1/2018 |
| CN | 108027313 A | 5/2018 |
| CN | 108169211 A | 6/2018 |
| CN | 109540807 A | 3/2019 |
| EP | 3485243 A1 | 5/2019 |
| WO | 2013/102661 A1 | 7/2013 |
| WO | 2018/011035 A1 | 1/2018 |

OTHER PUBLICATIONS

International Search Report of PCT/CN2019/112493 in Chinese, dated Jan. 16, 2020, with English translation.
Chinese Office Action in Chinese Application No. 201811237706.4, dated Mar. 2, 2020 with English translation.

* cited by examiner

SPECTROMETER AND MICRO-TOTAL ANALYSIS SYSTEM

CROSS REFERENCE TO RELATED APPLICATIONS

This application is the National Stage of PCT/CN2019/112493 filed on Oct. 22, 2019, which claims priority under 35 U.S.C. § 119 of Chinese Application No. 201811237706.4 filed on Oct. 23, 2018, the disclosure of which is incorporated by reference.

TECHNICAL FIELD

Embodiments of the present disclosure relate to a spectrometer and a micro-total analysis system.

BACKGROUND

The microfluidic chip laboratory in the micro-total analysis system is also called microfluidic chip or chip laboratory, which can integrate basic operation units, such as sample preparation, reaction, separation, detection, and the like, involved in biological and chemical fields into a chip of a few square centimeters or less, and the size of the operation unit is on micron scale. The microfluidic chip laboratory form a network by micro-channels to control fluids to flow through the entire system, thereby replacing various functions of conventional biological or chemical laboratories. The microfluidic chip laboratory has advantages of flexible combination and convenient large-scale integration.

SUMMARY

At least one embodiment of the present disclosure provides a spectrometer, and the spectrometer comprises a waveguide structure, a light source, a collimating mirror, a reflection grating, and a light extraction structure. The waveguide structure comprises a first surface and a second surface; the light source is on the waveguide structure and located on the first surface, the collimating mirror is on the waveguide structure and located on the second surface, the collimating mirror is configured to convert light, which is emitted by the light source, passes through the waveguide structure, and is incident on the collimating mirror, into collimating light, and the collimating light propagates in the waveguide structure in a total reflection mode. The reflection grating is on the waveguide structure and located on a reflection surface of the waveguide structure through which the collimating light passes in a total reflection propagation process, the reflection grating is configured to allow emergency angles of light of different wavelength ranges among the collimating light incident on the reflection grating to be different, so that the light of different wavelength ranges has an offset in the total reflection propagation process. The light extraction structure is located on a side of the reflection grating away from the light source and located on the reflection surface of the waveguide structure through which the light of different wavelength ranges passes in the total reflection propagation process, so that the light of different wavelength ranges emits from the light extraction structure.

For example, in the spectrometer provided by at least one embodiment of the present disclosure, the first surface and the second surface are opposite to each other, the waveguide structure further comprises a third surface, the third surface comprises a first edge extending in a first direction and a second edge extending in a second direction, the first surface and the third surface share the first edge, the first surface further comprises a third edge extending in a third direction, and a length of the second edge is greater than a length of the third edge.

For example, in the spectrometer provided by at least one embodiment of the present disclosure, a length of the first edge is not greater than 20 millimeters.

For example, in the spectrometer provided by at least one embodiment of the present disclosure, the second surface comprises an inclined portion having included angles with both the first direction and the third direction, the collimating mirror is located on the inclined portion, an included angle between the inclined portion and the first direction ranges from 17° to 29°, and an included angle between the inclined portion and the third direction ranges from 17° to 29°.

For example, in the spectrometer provided by at least one embodiment of the present disclosure, the waveguide structure is a cuboid with one corner cut off, the inclined portion is an inclined plane of the waveguide structure due to absence of the corner, and the collimating mirror is integrally formed with the inclined plane.

For example, in the spectrometer provided by at least one embodiment of the present disclosure, the collimating mirror is a reflection mirror formed by processing the inclined plane.

For example, in the spectrometer provided by at least one embodiment of the present disclosure, the collimating mirror is a parabolic mirror, a reflection surface of the parabolic mirror faces the light source, and an orthographic projection of a center of the light source on the first surface substantially coincides with an orthographic projection of a center of the parabolic mirror on the first surface.

For example, in the spectrometer provided by at least one embodiment of the present disclosure, a radius of curvature of a mirror surface of the parabolic mirror is twice a distance between the center of the light source and the center of the parabolic mirror, and the center of the light source is on a focal plane of the parabolic mirror.

For example, in the spectrometer provided by at least one embodiment of the present disclosure, the light extraction structure comprises a plurality of light extraction sub-structures, and light of different single wavelength ranges among the light of different wavelength ranges emits from different light extraction sub-structures.

For example, in the spectrometer provided by at least one embodiment of the present disclosure, the first surface and the second surface are opposite to each other, the waveguide structure further comprises a third surface, and the light extraction structure and the reflection grating are both located on the third surface of the waveguide structure; alternatively, the first surface and the second surface are opposite to each other, the waveguide structure further comprises a third surface and a fourth surface opposite to the third surface, and the light extraction structure and the reflection grating are located on the third surface and the fourth surface, respectively.

For example, in the spectrometer provided by at least one embodiment of the present disclosure, the light extraction structure and the reflection grating are located on a same surface of the waveguide structure.

For example, in the spectrometer provided by at least one embodiment of the present disclosure, the light extraction structure comprises a grating or a film distributed with dots.

For example, in the spectrometer provided by at least one embodiment of the present disclosure, the reflection grating covers only one reflection point of the collimating light on the waveguide structure.

For example, in the spectrometer provided by at least one embodiment of the present disclosure, the reflection grating comprises a one-dimensional grating.

For example, in the spectrometer provided by at least one embodiment of the present disclosure, the light source is attached to the first surface.

For example, in the spectrometer provided by at least one embodiment of the present disclosure, the light source comprises a point light source, the point light source is a micro light-emitting diode, and a maximum size of a light-emitting surface of the point light source ranges from 10 microns to 25 microns.

For example, in the spectrometer provided by at least one embodiment of the present disclosure, a divergence angle of the light source is not greater than 7°.

At least one embodiment of the present disclosure also provides a micro-total analysis system, which comprises: a microfluidic device, configured to contain a liquid to be detected; the spectrometer according to any one of the above embodiments, located on a light incident side of the microfluidic device and configured to irradiate light to the liquid to be detected; and a detector, located on a side of the microfluidic device away from the spectrometer and configured to detect the liquid to be detected and output a detection signal.

For example, in the micro-total analysis system provided by at least one embodiment of the present disclosure, the microfluidic device is fixedly connected or detachably connected to the spectrometer and the detector.

BRIEF DESCRIPTION OF THE DRAWINGS

In order to clearly illustrate the technical solutions of the embodiments of the present disclosure, the drawings of the embodiments will be briefly described in the following; and it is obvious that the described drawings are only related to some embodiments of the present disclosure and thus are not limitative to the present disclosure.

DETAILED DESCRIPTION

Figure 1A:
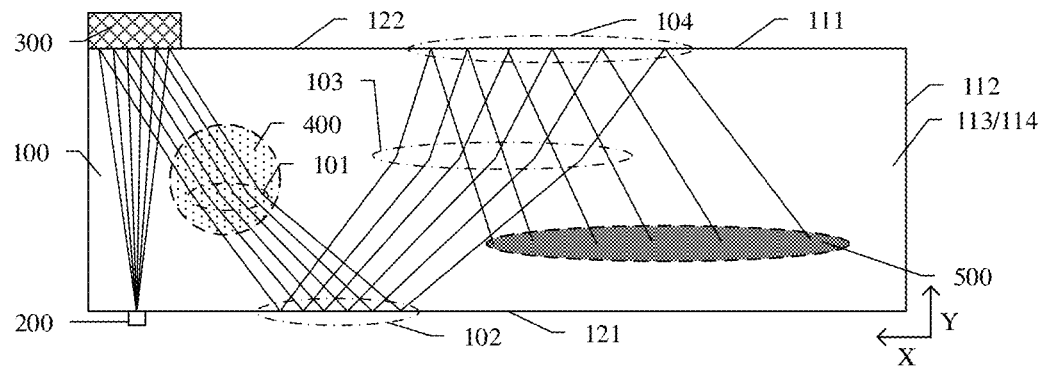
FIG. 1A and FIG. 1B are structural schematic diagrams of a spectrometer provided by at least one embodiment of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "comprise," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may comprise an electrical connection, directly or indirectly. "On," "under," "right," "left" and the like are only used to indicate relative position relationship, and when the position of the object which is described is changed, the relative position relationship may be changed accordingly. In order to keep the following description of embodiments of the present disclosure clear and concise, the present disclosure omits detailed descriptions of some known functions and known components.

In researches, the inventor of this application found that a general microfluidic chip laboratory is bulky, complicated to debug, and inconvenient to carry, and needs to couple external light sources through optical fibers. In addition, light of different wavelengths in the white light propagating in a total reflection mode in an optical waveguide is easy to cross talk in spectrometers generally applied to the microfluidic chip laboratory.

At least one embodiment of the present disclosure provides a spectrometer and a micro-total analysis system. The spectrometer provided by the embodiments of the present disclosure not only can realize a spectral splitting function at a specific position to avoid crosstalk of light of different wavelength ranges, but also can take a waveguide structure as a carrier to support elements such as a light source, a collimating mirror, a reflection grating, and the like, thereby realizing miniaturization and portability of the spectrometer and having good stability.

The embodiments of the present disclosure provide a spectrometer and a micro-total analysis system. The spectrometer provided by the embodiments of the present disclosure comprises a waveguide structure, a light source, a collimating mirror, and a reflection grating. The waveguide structure includes a first surface and a second surface. The light source is on the waveguide structure and located on the first surface, the collimating mirror is on the waveguide structure and located on the second surface, the collimating mirror is configured to convert light, which is emitted by the light source, passes through the waveguide structure and is incident on the collimating mirror, into collimating light, and the collimating light propagates in the waveguide structure in a total reflection mode. The reflection grating is on the waveguide structure and is located on the reflection surface of the waveguide structure through which the collimating light passes in a total reflection propagation process, and the reflection grating is configured to allow emergency angles of light of different wavelength ranges among the collimating light incident on the reflection grating to be different, so that the light of different wavelength ranges has an offset in the total reflection propagation process. The light extraction structure is located on a side of the reflection grating away from the light source and located on the reflection surface of the waveguide structure through which the light of different wavelength ranges passes in the total reflection propagation process, so that the light of different wavelength ranges emits from the light extraction structure. For example, the light source is a point light source. For example, in some embodiments of the present disclosure, the above-mentioned light source (e.g., a point light source) may be omitted in the spectrometer, and the light source may be provided by other external devices or adopt external light sources.

In the spectrometer provided by the embodiments of the present disclosure, light emitted by the light source (e.g., a point light source) passes through the waveguide structure and is incident on the collimating mirror to become the collimating light, and the light of different wavelength ranges among the collimating light incident on the reflection grating is separated in different emergency angles, and propagates in the waveguide structure for a certain distance to realize separation in physical coordinates, so that the spectral splitting function can be realized at a specific position, and crosstalk of the light of different wavelength ranges is avoided. The spectrometer provided by the embodiments of the present disclosure takes the waveguide structure as a carrier to support the elements, such as a light source, a collimating mirror, a reflection grating, and the like, thereby realizing miniaturization and portability of the spectrometer and having good stability.

The spectrometer and the micro-total analysis system provided by the embodiments of the present disclosure are exemplarily described below with reference to the accompanying drawings.

Figure 1B:
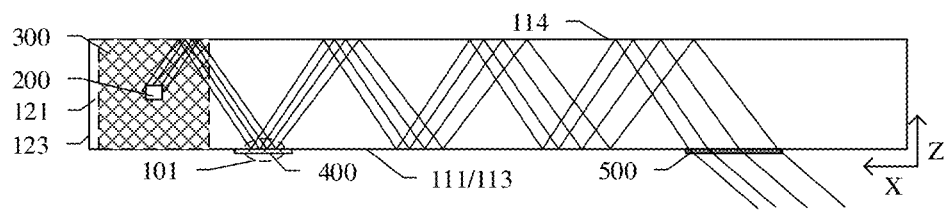

FIG. 1A and FIG. 1B are structural schematic diagrams of a spectrometer provided by at least one embodiment of the present disclosure. FIG. 1A is, for example, a top view of the spectrometer, and FIG. 1B is, for example, a front view of the spectrometer. As illustrated in FIG. 1A and FIG. 1B, the spectrometer includes a waveguide structure 100, a light source 200, a collimating mirror 300, and a reflection grating 400. For example, in some embodiments of the present disclosure, the light source (e.g., point light source) 200 may be omitted in the spectrometer, and the light source may be provided by other external devices or adopt external light sources. The waveguide structure 100 includes a first surface 121 and a second surface 122. The point light source 200 is on the waveguide structure 100 and located on the first surface 121, and the collimating mirror 300 is on the waveguide structure 100 and located on the second surface 122. FIG. 1A schematically illustrates that the first surface 121 and the second surface 122 are two surfaces opposite to each other, but the embodiments of the present disclosure are not limited thereto. The first surface 121 and the second surface 122 may also be two adjacent surfaces, which may be determined according to actual requirements, for example, according to a specific light path.

For example, as illustrated in FIG. 1A and FIG. 1B, the waveguide structure 100 further includes a third surface 113, and the third surface 113 includes a first edge 111 extending in a first direction (i.e., a X direction illustrated in FIG. 1A) and a second edge 112 extending in a second direction (i.e., a Y direction illustrated in FIG. 1A). The first surface 121 (or the second surface 122) and the third surface 123 share the first edge 111, the first surface 121 further includes a third edge 123 extending in a third direction (i.e., a Z direction illustrated in FIG. 1B), and a length of the second edge 112 is greater than a length of the third edge 123. Therefore, the third surface 113 is a main surface of the waveguide structure 100, that is, the third surface 113 is a surface with a largest area of the waveguide structure 100, while the first surface 121 and the second surface 122 are two side surfaces of the waveguide structure 100.

This embodiment is described by taking the case that a shape of the waveguide structure 100 is a cuboid as an example, that is, the first direction is perpendicular to the second direction, and the first direction is perpendicular to the third direction. In addition, FIG. 1A schematically illustrates that the point light source 200 and the collimating mirror 300 are respectively located on two opposite sides of the waveguide structure 100. The embodiments are not limited to this case. The point light source 200 and the collimating mirror 300 may also be respectively located on two opposite main surfaces of the waveguide structure 100, as long as the light emitted by the point light source 200 becomes collimating light after passing through the waveguide structure 100 and being incident on the collimating mirror 300.

FIG. 1A illustrates a top view of a spectrometer and a schematic diagram of a propagation path of light in the spectrometer. In this embodiment, a plane parallel to a XY plane in the spectrometer is taken as the third surface of the spectrometer. FIG. 1B illustrates a front view of the spectrometer illustrated in FIG. 1A. In this embodiment, a plane parallel to the XZ plane in the spectrometer is taken as the first surface or the second surface of the spectrometer. As illustrated in FIG. 1A and FIG. 1B, the point light source 200 and the collimating mirror 300 are located on the first surface 121 and the second surface 122 which are opposite to each other, respectively. The collimating mirror 300 is used to converge divergent light emitted by the point light source 200 into the collimating light, and the collimating light emitted after the light emitted by the point light source 200 is incident on the collimating mirror 300 propagates in the waveguide structure 100 in a total reflection mode. FIG. 1B schematically illustrates the first surface 121 on which the point light source 200 is located, while the collimating mirror 300 on the second surface 122 opposite to the first surface 121 is illustrated in a dashed box.

As illustrated in FIG. 1A and FIG. 1B, the reflection grating 400 included in the spectrometer is located on a reflection surface of the waveguide structure 100 through which the collimating light passes in a total reflection propagation process. The waveguide structure 100 further includes a fourth surface 114 opposite to the third surface 113. FIG. 1A schematically illustrates the third surface 113 and the fourth surface 114 which are opposite to each other in the waveguide structure 100, and schematically illustrates the first surface 121 and the second surface 122 which are opposite to each other. For example, the third surface 113, the fourth surface 114, the first surface 121, and the second surface 122 can all serve as the reflection surfaces on which the collimating light is reflected in a total reflection mode, and therefore, the reflection grating 400 may be located on the third surface 113 or the fourth surface 114 of the waveguide structure 100, or may be located on the first surface 121 or the second surface 122 of the waveguide structure 100.

As illustrated in FIG. 1A and FIG. 1B, before the collimating light is incident on the reflection grating 400, propagation directions of the light in different wavelength ranges included in the collimating light are parallel, that is, the light rays among the collimating light are all parallel to each other, whereby the incident angles of the light rays among the collimating light are all the same when the light rays are incident on the reflection grating 400. After the collimating light is incident on the reflection grating 400, the emergency angles of the light of different wavelength ranges among the collimating light are different, so that the light of different wavelength ranges has a certain offset in the total reflection propagation process, that is, the reflection grating 400 can divide the white light into light of different wavelength ranges according to a certain resolution. Therefore, the reflection grating 400 in the spectrometer can deflect light beams with different wavelengths by different angles, and the deviation of light-emitting positions of light of different wavelengths can be further realized through transmission in the waveguide structure 100, which not only can achieve the effect of spectral splitting at specific positions, but also can avoid crosstalk of light of different wavelength ranges. For obvious illustration, a difference in the emergency angles, between the light of different wavelength ranges emitted from the reflection grating 400, is schematically larger as illustrated in FIG. 1A, so as to enable the dispersion more obvious.

Because the reflection grating 400 is affected by two variables, i.e., wavelength and angle, when splitting light, the light incident on the reflection grating 400 in this embodiment is collimating light, that is, the incident angles of the light incident on the reflection grating 400 are all the same, so that the influence of angle on the splitting effect can be eliminated in the case where the reflection grating 400 splits light, and the reflection grating 400 splits light mainly according to wavelength.

For example, the reflection grating 400 may be a grating structure fabricated directly on the surface of the waveguide structure 100, or a fabricated grating structure may be attached to the surface of the waveguide structure 100 as a reflection grating, and the embodiments of the present disclosure are not limited to this case. In the case where the reflection grating 400 is a structure fabricated directly on the surface of the waveguide structure 100, the reflection grating 400 can be fabricated on the third surface 113 of the waveguide structure 100 for convenience of fabrication.

In the actual process, the position of the reflection grating can be simulated and calculated by using a light tracing software, such as lighttools or zemax, and then the reflection grating is fabricated or attached at the calculated position.

For example, the reflection grating 400 may be a one-dimensional grating, and the grating equation is $n_1 \sin \theta_1 \pm n_2 \sin \theta_2 = m\lambda/p$, $m=0, \pm1, \pm2 \ldots$. The above $\theta_1$ and $\theta_2$ represent the incident angle of the collimating light incident on the reflection grating 400 and the emergency angle of light emitted from the reflection grating 400, respectively, $n_1$ and $n_2$ represent the refractive index of the medium at an incident end and the refractive index of the medium at an emergency end of the reflection grating 400, respectively, $\lambda$, represents the wavelength of the incident light, and p represents the grating period. In this embodiment, $n_1$ and $n_2$ are both the refractive index of the waveguide structure, the incident angles $\theta_1$ of light of all wavelengths are the same, and the angle $\theta_2$ of the emergent light is determined by the wavelength. Therefore, the light splitting characteristics of the reflection grating 400 can be utilized to realize the offset of the emergent positions of the light of different wavelengths (or different wavelength ranges).

For example, the reflection grating 400 may also be a Bragg grating, a blazed grating, or the like, as long as the beams of different wavelengths (or different wavelength ranges) can be deflected by different angles.

For example, FIG. 1A and FIG. 1B schematically illustrate that the reflection grating 400 is located on the third surface 113. FIG. 1A schematically illustrates that the collimating light emitted from the collimating mirror 300 is totally reflected at the position where the reflection grating 400 is located, and all the collimating light incident on the reflection grating 400 is reflected by the reflection grating 400, that is, a specific reflection point 101 when the collimating light is incident on the reflection grating 400 is completely within the reflection grating 400. FIG. 1A schematically illustrates that a first reflection point of the light emitted from the collimating mirror 300 in the waveguide structure 100 is the specific reflection point 101 completely covered by the reflection grating 400, but the embodiments of the present disclosure are not limited to this case, and the light emitted from the collimating mirror 300 may be incident on the reflection grating 400 after performing at least one total reflection propagation.

For example, as illustrated in FIG. 1A, the light emitted from the reflection grating 400 is totally reflected at a reflection point 102 of the first surface 121, and then is totally reflected at a reflection point 103 of the fourth surface 114 and a reflection point 104 of the second surface 122, respectively. FIG. 1A only schematically illustrates 4 reflection points, all of which are circled by dotted lines, and there are more reflection points in the actual waveguide structure. Because the light of different wavelengths emitted from the reflection grating 400 is reflected on the first surface 121, the second surface 122, the third surface 113, and the fourth surface 114 of the waveguide structure 100, the optical path can be effectively folded, and the optical distance can be increased, thereby allowing the light of different wavelengths to have a larger separation distance in physical coordinates. The embodiments of the present disclosure are not limited to this case, and the light ray may propagate in a total reflection mode only on the third surface 113 and the fourth surface 114, as long as the light of different wavelengths can be separated in physical coordinates. For the sake of clarity, FIG. 1B only schematically illustrates that the light, which is emitted from the reflection grating 400, is reflected on the third surface 113 and the fourth surface 114, and does not illustrate the case where the light is reflected on the first surface 121 and the second surface 122.

For example, as illustrated in FIG. 1A and FIG. 1B, the specific reflection point 101 of the collimating light on the waveguide structure 100 is completely within the reflection grating 400, and other reflection points (e.g., reflection points 102-104, etc.) of the collimating light or the light of different wavelength ranges on the waveguide structure 100 other than the specific reflection point 101 do not overlap with the reflection grating 400, i.e., the reflection grating 400 covers only one reflection point 101 of the collimating light on the waveguide structure 100. For example, an area of the reflection grating 400 is larger than an area of the specific reflection point 101, so the reflection grating 400 can allow the incident collimating light to be totally reflected, thereby improving the light utilization rate and reducing the light loss.

For example, in the case where the reflection grating 400 is located on the third surface 113, other reflection points of the collimating light on the third surface 113 other than the specific reflection point 101 do not overlap with the reflection grating 400.

For example, the reflection grating 400 may cover a region between the specific reflection point 101 and other reflection points adjacent to the specific reflection point 101, as long as the reflection grating 400 does not overlap with other reflection points other than the specific reflection point 101. Generally, the distance between adjacent reflection points located on the same surface is relatively large, and thus, in the embodiments of the present disclosure, requirements on the size and alignment accuracy of the reflection grating 400 are lower, thereby lowering the process difficulty and significantly improving the stability of the spectrometer.

For example, as illustrated in FIG. 1A and FIG. 1B, the spectrometer further includes a light extraction structure 500. The light extraction structure 500 is located on a side of the reflection grating 400 away from the point light source 200, and is located on the reflection surface of the waveguide structure 100 through which the light of different wavelength ranges passes in the total reflection propagation process, so that the light of different wavelength ranges is emitted from the light extraction structure 500, that is, the light extraction structure 500 can extract light of various wavelengths (or various wavelength ranges), which is transmitted in the waveguide structure 100 and separated by a certain distance, from the waveguide structure 100.

For example, the light extraction structure 500 may be a grating to deflect the light rays, or the light extraction structure 500 may be a film distributed with dots provided on the surface of the waveguide structure 100 to extract the light rays by damaging the total reflection condition through defects.

For example, as illustrated in FIG. 1A and FIG. 1B, the light extraction structure 500 and the reflection grating 400 are both located on the third surface 113 of the waveguide structure 100. For example, the light extraction structure 500 and the reflection grating 400 may both be located on the third surface 113, or may be located on the third surface 113 and the fourth surface 114, respectively. In order to facilitate the fabrication of the reflection grating 400 and the light extraction structure 500, the light extraction structure 500 and the reflection grating 400 may be on the same surface of the waveguide structure 100. FIG. 1A schematically illustrates that both the reflection grating 400 and the light extraction structure 500 are located on the third surface 113, while the main surface in FIG. 1A is the fourth surface 114, whereby the reflection grating 400 and the light extraction structure 500 are illustrated in dashed boxes.

For example, as illustrated in FIG. 1A and FIG. 1B, the light of different wavelengths emitted from the reflection grating 400 usually requires several reflections before there is sufficient optical distance difference to perform light splitting. Therefore, the light extraction structure 500 can be located at a position away from the reflection grating 400, i.e., the light extraction structure 500 is located at a position of the reflection point away from the reflection grating 400 to ensure sufficient optical distance difference for light splitting.

For example, a length of the first edge 111 of the third surface 113 of the waveguide structure 100 provided by this embodiment is not greater than 20 millimeters (mm). For example, in some embodiments, the length of the first edge 111 is not less than 10 millimeters. In this embodiment, the sufficient optical distance difference of the light of different wavelengths emitted from the reflection grating 400 can be ensured to perform light splitting in the case where the length of the first edge 111 (i.e., the longest edge) of the waveguide structure 100 is not greater than 20 mm (e.g., further, not less than 10 mm), by adjusting the propagation direction of the collimating light emitted from the collimating mirror 300 and the position of the reflection grating 400. Therefore, the waveguide structure 100 provided by this embodiment has a small volume, is convenient to integrate and carry, and greatly improves the operability in fields of spectral detection.

Figure 2:
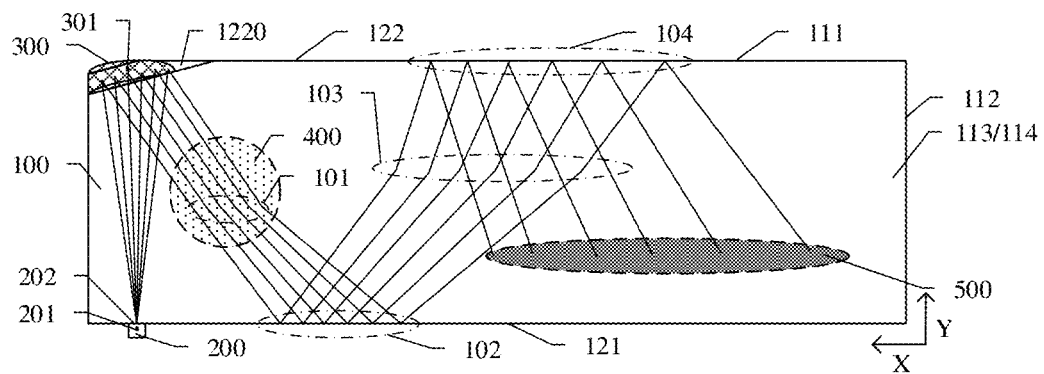
FIG. 2 is a structural schematic diagram of a spectrometer provided by an example of at least one embodiment of the present disclosure.

For example, FIG. 2 is a structural schematic diagram of a spectrometer provided by an example of at least one embodiment of the present disclosure. As illustrated in FIG. 2, the point light source 200 is located on the first surface 121, a light-emitting surface of the point light source 200 faces the second surface 122, and the light emitted from the point light source 200 propagates along the Y direction. In order to realize that the collimating light emitted from the collimating mirror 300 can not only propagates in the waveguide structure 100 in a total reflection mode, but also have sufficient optical distance difference during the continuous total reflection propagation process after passing through the reflection grating 400 to perform light splitting, the collimating mirror 300 needs to deflect the light emitted from the point light source 200 along the Y direction to the X direction and the Z direction by a certain angle.

This embodiment schematically illustrates that the collimating mirror 300 deflects the light propagating along the Y direction to the X direction and the Z direction by a certain angle, but the embodiments of the present disclosure are not limited to this case, and the propagation direction of the light emitted from the point light source 200 may include components along the Y direction and the X direction, and the collimating mirror 300 deflects the light along the Y direction and the X direction to the Z direction by a certain angle; or the propagation direction of the light emitted from the point light source 200 includes components along the Y direction and the Z direction, and the collimating mirror 300 deflects the light along the Y direction and the Z direction to the X direction by a certain angle; or the propagation direction of the light emitted from the point light source 200 includes components along the X direction, the Y direction, and the Z direction, and the collimating mirror 300 does not need to deflect the propagation direction of the light beam.

Figure 3:
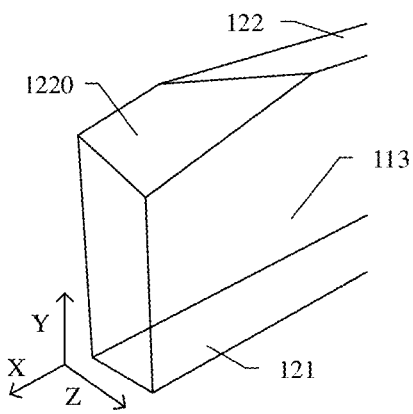
FIG. 3 is a partial structural schematic diagram of a waveguide structure in the spectrometer illustrated in FIG. 2.

For example, FIG. 3 is a partial structural schematic diagram of a waveguide structure in the spectrometer illustrated in FIG. 2. As illustrated in FIG. 2 and FIG. 3, the second surface 122 on which the collimating mirror 300 is located includes an inclined portion 1220 having a certain angle with both the first direction (X direction) and the third direction (Z direction). The collimating mirror 300 is located on the inclined portion 1220, an included angle between the inclined portion 1220 and the first direction ranges from 17° to 29°, and an included angle between the inclined portion 1220 and the third direction ranges from 17° to 29°.

For another example, the included angle between the inclined portion 1220 and the first direction ranges from 17° to 20°, and the included angle between the inclined portion 1220 and the third direction ranges from 17° to 20°. For still another example, the included angle between the inclined portion 1220 and the first direction ranges from 25° to 29°, and the included angle between the inclined portion 1220 and the third direction ranges from 25° to 29°.

For example, the included angle between the inclined portion 1220 and the first direction is a first included angle, the included angle between the inclined portion 1220 and the third direction is a second included angle, the first included angle and the second included angle may be the same or different, and the embodiments of the present disclosure are not limited to this case.

For example, as illustrated in FIG. 3, the waveguide structure 100 is a cuboid with one corner cut off, and the inclined portion 1220 is an inclined plane of the waveguide structure 100 due to absence of the corner, that is, the inclined portion 1220 may be a surface obtained by performing special process (e.g., cutting process) on a corner of the waveguide structure 100. The reflection surface of the collimating mirror 300 is disposed on the inclined portion 1220, so that the light reflected by the collimating mirror 300 can introduce rotational components in the X direction and the Z direction. The embodiments of the present disclosure are not limited to this case, the collimating mirror 300 may be disposed on a surface that has not been specially processed, and the point light source 200 may be disposed on the inclined portion, as long as the collimating light emitted from the collimating mirror 300 can propagate in the waveguide structure 100 in a total reflection mode.

For example, as illustrated in FIG. 2, the collimating mirror 300 may be a parabolic mirror, the parabolic mirror may be a mirror fabricated by a machining process on the inclined portion 1220, or the fabricated parabolic mirror may be attached to the inclined portion 1220.

For example, as illustrated in FIG. 2, the reflection surface of the parabolic mirror faces the point light source 200, and an orthographic projection of a center 201 of the point light source 200 on the first surface 121 substantially coincides with an orthographic projection of a center 301 (e.g., a center of the mirror) of the parabolic mirror (i.e., the collimating mirror 300) on the first surface 121, i.e., the center 201 of the point light source 200 is on a focal plane of the parabolic mirror, so that diverging light emitted from the point light source 200 is converged into parallel collimating light. For example, a radius of curvature of a mirror surface of the collimating mirror 300 is twice a focal length of the collimating mirror 300, that is, the radius of curvature of the mirror surface of the collimating mirror 300 is twice the distance between the center 301 of the mirror surface and the focal plane of the collimating mirror 300.

For example, the waveguide structure 100 provided by this embodiment is a planar waveguide, and the waveguide structure 100 serves as both a medium for optical transmission and a carrier for supporting other structures. For example, as illustrated in FIG. 2, the waveguide structure 100 is used to support structures, such as the point light source 200, the collimating mirror 300, the reflection grating 400, and the light extraction structure 500. For example, the point light source 200, the collimating mirror 300, the reflection grating 400, the light extraction structure 500, and the waveguide structure 100 can be fixedly connected or detachably connected, thereby being integrated into an integrated structure, and realizing miniaturization and portability of the spectrometer.

For example, the waveguide structure 100 can be a glass plate, and the waveguide structure 100 with the collimating mirror 300 described above can be obtained by cutting and processing one corner of the glass plate. The collimating mirror 300, the reflection grating 400 and the light extraction structure 500 provided by the embodiments of the present disclosure can be directly fabricated on the surface of the waveguide structure 100, thereby simplifying the structure of the spectrometer.

For example, as illustrated in FIG. 2, the light-emitting surface 202 of the point light source 200 is attached to the surface of the waveguide structure 100, so that the point light source 200 and the waveguide structure 100 are integrated, the integration of the light source is realized, and the portability of the spectrometer can be greatly improved.

For example, the spectrometer provided by the embodiments of the present disclosure has a smaller size, so the point light source 200 included in the spectrometer should be a point light source having a smaller size. For example, the point light source 200 may be a micro light-emitting diode (μ-LED) light source, and a maximum size of the light-emitting surface 202 of the point light source 200 is in a range of 10-25 microns. For example, in the case where the light-emitting surface 202 of the point light source 200 is a circle, the diameter of the circle is in a range of 10-25 microns. The embodiments of the present disclosure have no special requirement for the spectrum of the point light source 200, which can be determined according to actual requirements, for example, as long as the point light source 200 has a wider spectral range.

For example, the divergence angle of the point light source 200 is not greater than 7°, so that high splitting accuracy of the spectrometer can be ensured, and for example, the splitting accuracy can be achieved to 5 nm. For example, the divergence angle of the point light source 200 is greater than or equal to 0°.

Figure 4:
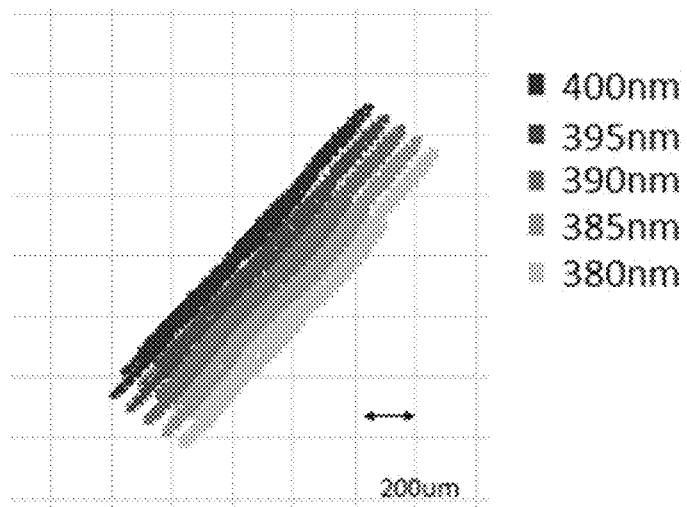
FIG. 4 is a schematic diagram of distribution of emergent light spots of a spectrometer provided by at least one embodiment of the present disclosure.

For example, FIG. 4 is a schematic diagram of the distribution of emergent light spots of a spectrometer provided by at least one embodiment of the present disclosure. As illustrated in FIG. 4, the spectrometer provided by the embodiments of the present disclosure can achieve the splitting accuracy of 5 nm, and the light spots of respective wavelength ranges are large. Therefore, in the case where the spectrometer is used in a microfluidic chip laboratory, it is beneficial to the sensing of the detector and droplet control, and there is large operation space for different wavelengths. In addition, the spectrum range applicable to the spectrometer is not limited to the part (380-400 nm) illustrated in the figure, but is applicable to a very large spectrum range, and accurate light splitting in a wide spectrum range can be realized. In the case where a more accurate light splitting effect is needed, a segmented light splitting design can also be adopted, i.e., a structure is designed separately for light in a certain wavelength range, and the structures are assembled finally.

Figure 5:
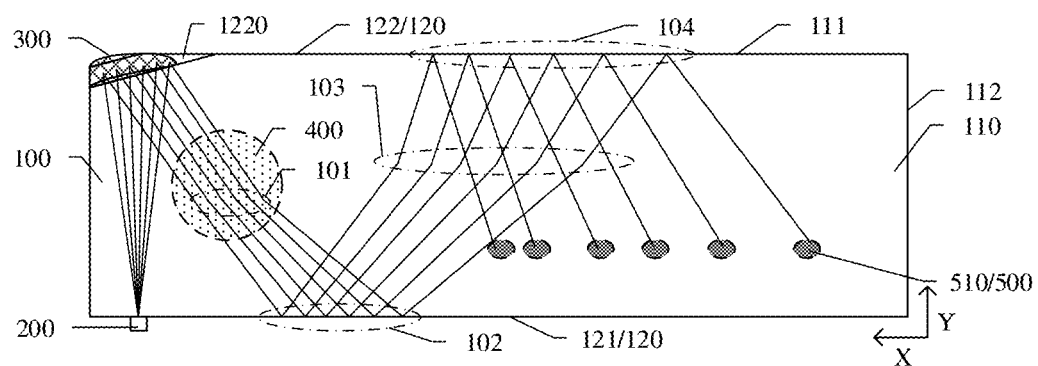
FIG. 5 is a structural schematic diagram of a spectrometer provided by another example of at least one embodiment of the present disclosure.

For example, FIG. 5 is a structural schematic diagram of a spectrometer provided by another example of at least one embodiment of the present disclosure. As illustrated in FIG. 5, the light extraction structure 500 in this example includes a plurality of light extraction sub-structures 510, and light of different single wavelength ranges to be extracted among the light of different wavelength ranges can be emitted from different light extraction sub-structures 510, respectively. Because the reflection grating 400 in the spectrometer can deflect the light beams of different wavelength ranges by different angles, and the deviation of light-emitting positions can further be realized through transmission in the waveguide structure 100, so as to achieve the effect of spectrum splitting at specific positions, and thus the light extraction sub-structure 510 can be arranged at specific position to extract light in a single wavelength range to be extracted.

The spectrometer provided by the embodiments of the present disclosure can overcome the defects of the traditional spectrometer system, such as large volume, insufficient stability and portability, and the like. Moreover, due to the completeness of integration, no external light source is needed, so that the application range of spectral detection can be greatly improved, and the application scenes can be enriched. In addition, the spectrometer provided by the embodiments of the present disclosure has lower processing technology requirements, the overall device structure is simple, the requirements for size and alignment of the reflection grating is low, and the spectrometer is convenient to be realized.

Figure 6:
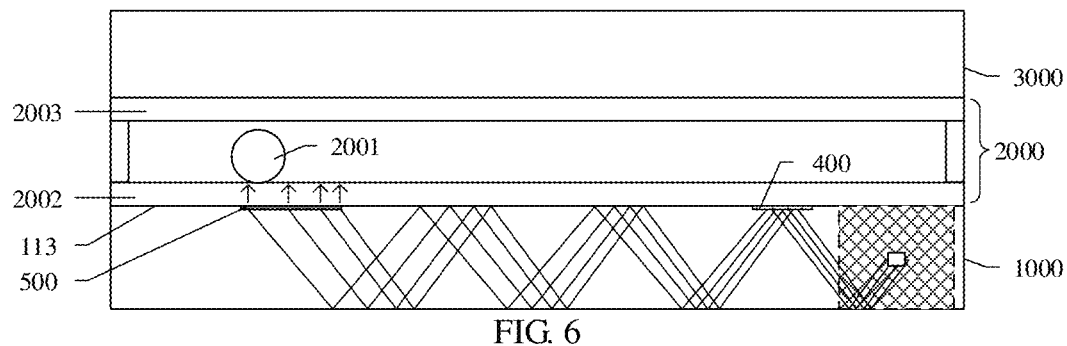
FIG. 6 is a partial structural schematic diagram of a micro-total analysis system provided by at least one embodiment of the present disclosure.

Another embodiment of the present disclosure provides a micro-total analysis system. FIG. 6 is a partial structural schematic diagram of a micro-total analysis system provided by at least one embodiment of the present disclosure. As illustrated in FIG. 6, the micro-total analysis system includes a microfluidic device 2000, the spectrometer 1000 provided by the above embodiments, and a detector 3000.

As illustrated in FIG. 6, the microfluidic device 2000 is a microfluidic chip, and the microfluidic device 2000 is configured to contain a liquid 2001 to be detected, and for example, the liquid 2001 may be a droplet, a fluid, or the like.

For example, as illustrated in FIG. 6, the microfluidic device 2000 includes a first base substrate 2002 and a second base substrate 2003 which are parallel to the third surface 113 of the spectrometer 1000 and are oppositely to each other. The liquid 2001 to be detected is between the first base substrate 2002 and the second base substrate 2003. For example, the materials of the first base substrate 2002 and the second base substrate 2003 include glass or other transparent materials, and the embodiments of the present disclosure are not limited thereto.

For example, in an example of this embodiment, the microfluidic device 2000 may be an electrowetting microfluidic device, and includes a first electrode disposed on the first base substrate 2002 and a second electrode disposed on the second base substrate 2003. An electric field may be formed between the second electrode and the first electrode, and the formed electric field can operate the liquid 2001 to be detected, such as enable the liquid 2001 to be detected to move along a desired route and a desired direction.

As illustrated in FIG. 6, the spectrometer 1000 is located on a light incident side of the microfluidic device 2000 and is configured to irradiate light to the liquid 2001 to be detected. For example, the reflection grating 400 of the spectrometer 1000 provided by the above embodiments can deflect the light beams of different wavelength ranges by different angles, and the deviation of the light-emitting position can be further realized through transmission in the waveguide structure 100, so as to achieve the effect of spectrum splitting at a specific position. Therefore, the light of different wavelength ranges extracted from the light extraction structure 500 can be irradiated on the liquid 2001 to be detected in the microfluidic device 2000. For example, the liquid 2001 to be detected can be controlled to move to different light-emitting positions by generating an electric field between the first electrode and the second electrode, so that the light irradiated on the liquid 2001 to be detected has different wavelength ranges.

For example, in the case where the light of different wavelength ranges extracted from the light extraction structure 500 acts on the liquid 2001 to be detected, the liquid 2001 to be detected can undergo different reactions, or the light transmitted through the liquid 2001 to be detected may have different characteristics (e.g., different light intensity and/or different brightness). Therefore, only one point light source needs to be used to obtain the light of different wavelength ranges, thereby reducing the power consumption.

As illustrated in FIG. 6, the detector 3000 is located on a side of the microfluidic device 2000 away from the spectrometer 1000, and is configured to detect the liquid 2001 to be detected and output a detection signal.

For example, the light emitted from the spectrometer 1000 is irradiated onto the detector 3000 through the microfluidic device 2000, and the detection information (e.g., composition, content, etc.) of the liquid 2001 to be detected can be obtained through information, such as the light intensity, brightness, etc., detected by the detector 3000. For example, the light intensity and/or brightness of the light passing through the droplet-containing portion and the droplet-free portion are different, and the light intensity and/or brightness of the light passing through the droplets with different components are also different, so that the detection information can be obtained.

For example, the detector 3000 may include a sensor group, but the embodiments of the present disclosure are not limited thereto. For example, the sensor group includes at least one of an optical sensor, a capacitive sensor, a temperature sensor, or an ultrasonic sensor. In the embodiments of the present disclosure, the microfluidic device 2000 moves the liquid drop to the light-emitting position of the light of the specified wavelength, the liquid drop interacts with the light, and the detector 3000 analyzes the change of light energy, thereby realizing the spectral analysis function.

For example, after a first light emitted from the spectrometer 1000 passes through the liquid 2001 to be detected, the liquid 2001 to be detected is excited to generate a second light, which is the light emitted, under the excitation of the first light, by a marker carried by a target cell in the liquid 2001 to be detected reacting with a marker cell. For example, the second light may be fluorescence, but the embodiments of the present disclosure are not limited thereto. Then, the detection information of the liquid 2001 to be detected can be obtained by the second light detected by the detector 3000.

For example, the second light emitted from the liquid 2001 to be detected may also be, for example, the first light with partial light loss, emitted from the spectrometer 1000 and irradiated to the detector 3000 through the microfluidic device 2000. The light loss may include intensity attenuation and or the like. The detection signal may be output by detecting the light loss. For example, the information, such as the position and shape of the liquid droplet to be detected, can be obtained by using this type of light with partial light loss.

For example, by taking gene detection as an example, the working principle of the micro-total analysis system provided by an example of the embodiments of the present disclosure is described below. The liquid 2001 to be detected in the microfluidic device 2000 is separated into a plurality of sub-liquid droplets, and respective sub-liquid droplets are controlled to move to different positions by applying an electric field. Target cells in the liquid droplets react with marker cells at corresponding positions to carry markers, such as luciferase and the like. The marker emits different fluorescence photons under the excitation of the light of different wavelengths. The detector 3000 (e.g., a photodiode) is irradiated with fluorescence to generate voltage/current signals corresponding to the light, so that different detection can be performed at different positions (e.g., different gene fragments can be detected), and simultaneous detection of different detection objects can be realized.

For example, the microfluidic device 2000 in the embodiments of the present disclosure is fixedly connected or detachably connected to the spectrometer 1000 and the detector 3000, thereby being integrated into an integrated structure. That is, the waveguide structure 100 included in the spectrometer 1000 serves as both a light transmission medium and an integrated frame of the microfluidic device 2000, and the detector 3000 can be integrated on a base substrate (e.g., the second base substrate 2003) of the microfluidic device 2000, thereby realizing a trinity micro-total analysis system. In this way, the portability of the spectral detection system can be greatly improved, the application scenarios of the spectral detection can be enriched, and the use cost can be effectively reduced.

The micro-total analysis system provided by the embodiments of the present disclosure integrates the light source and the microfluidic device into a whole, so that the micro-total analysis system is more convenient to use and consumes less resources. Due to the completeness of integration, no external light source is needed, thus greatly improving the application range of spectral detection and enriching application scenes. On this basis, the integrated light source can provide light beams of various wavelength ranges with good collimation and monochromaticity, and can cover a wide spectrum range as well, so that the wide spectrum detection can be realized, and the integrated light source can be used for detecting the types, contents and other characteristics of substances.

The following statements need to be noted.

(1) The drawings of the embodiments of the present disclosure involve only the structures related to the embodiments of the present disclosure, and other structures may be referred to general design.

(2) In case of no conflict, the embodiments of the present disclosure and the features in the embodiments can be combined with each other to obtain new embodiments.

What have been described above merely are specific implementations of the present disclosure, but the protection scope of the present disclosure is not limited to this. The protection scope of the present disclosure is determined by the appended claims.

What is claimed is:

1. A spectrometer, comprising:
a waveguide structure, comprising a first surface and a second surface;
a light source and a collimating mirror, wherein the light source is on the waveguide structure and located on the first surface, the collimating mirror is on the waveguide structure and located on the second surface, the collimating mirror is configured to convert light, which is emitted by the light source, passes through the waveguide structure, and is incident on the collimating mirror, into collimating light, and the collimating light propagates in the waveguide structure in a total reflection mode;
a reflection grating, on the waveguide structure and located on a reflection surface of the waveguide structure through which the collimating light passes in a total reflection propagation process, wherein the reflection grating is configured to allow emergency angles of light of different wavelength ranges among the collimating light incident on the reflection grating to be different, so that the light of different wavelength ranges has an offset in the total reflection propagation process; and
a light extraction structure, located on a side of the reflection grating away from the light source and located on the reflection surface of the waveguide structure through which the light of different wavelength ranges passes in the total reflection propagation process, so that the light of different wavelength ranges emits from the light extraction structure,
wherein the first surface and the second surface are opposite to each other, the waveguide structure further comprises a third surface, and the light extraction structure and the reflection grating are both located on the third surface of the waveguide structure; or,
the first surface and the second surface are opposite to each other, the waveguide structure further comprises a third surface and a fourth surface opposite to the third surface, and the light extraction structure and the reflection grating are located on the third surface and the fourth surface, respectively.

2. The spectrometer according to claim 1, wherein the third surface comprises a first edge extending in a first direction and a second edge extending in a second direction, the first surface and the third surface share the first edge, the first surface further comprises a third edge extending in a third direction, and a length of the second edge is greater than a length of the third edge.

3. The spectrometer according to claim 2, wherein a length of the first edge is not greater than 20 millimeters.

4. The spectrometer according to claim 2, wherein the second surface comprises an inclined portion having a first included angle with the first direction and having a second include angle with the third direction, the collimating mirror is located on the inclined portion, the first included angle between the inclined portion and the first direction ranges from 17° to 29°, and the second included angle between the inclined portion and the third direction ranges from 17° to 29°.

5. The spectrometer according to claim 4, wherein the waveguide structure is a cuboid with one corner cut off, the inclined portion is an inclined plane of the waveguide structure due to absence of the corner, and the collimating mirror is integrally formed with the inclined plane.

6. The spectrometer according to claim 5, wherein the collimating mirror is a reflection mirror formed by processing the inclined plane.

7. The spectrometer according to claim 6, wherein the collimating mirror is a parabolic mirror, a reflection surface of the parabolic mirror faces the light source, and an orthographic projection of a center of the light source on the first surface substantially coincides with an orthographic projection of a center of the parabolic mirror on the first surface.

8. The spectrometer according to claim 7, wherein a radius of curvature of a mirror surface of the parabolic mirror is twice a distance between the center of the light source and the center of the parabolic mirror, and the center of the light source is on a focal plane of the parabolic mirror.

9. The spectrometer according to claim 1, wherein the light extraction structure comprises a plurality of light extraction sub-structures, and light of different single wavelength ranges among the light of different wavelength ranges emits from different light extraction sub-structures.

10. The spectrometer according to claim 1, wherein the light extraction structure and the reflection grating are located on a same surface of the waveguide structure.

11. The spectrometer according to claim 1, wherein the light extraction structure comprises a grating or a film distributed with dots.

12. The spectrometer according to claim 1, wherein the reflection grating covers only one reflection point of the collimating light on the waveguide structure.

13. The spectrometer according to claim 1, wherein the reflection grating comprises a one-dimensional grating.

14. The spectrometer according to claim 1, wherein the light source is attached to the first surface.

15. The spectrometer according to claim 1, wherein the light source comprises a point light source, the point light source is a micro light-emitting diode, and a maximum size of a light-emitting surface of the point light source ranges from 10 microns to 25 microns.

16. The spectrometer according to claim 1, wherein a divergence angle of the light source is not greater than 7°.

17. A micro-total analysis system, comprising:
a microfluidic device, configured to contain a liquid to be detected;
the spectrometer according to claim 1, located on a light incident side of the microfluidic device and configured to irradiate light to the liquid to be detected; and
a detector, located on a side of the microfluidic device away from the spectrometer and configured to detect the liquid to be detected and output a detection signal.

18. The micro-total analysis system according to claim 17, wherein the microfluidic device is fixedly connected or detachably connected to the spectrometer and the detector.

19. The spectrometer according to claim 3, wherein the second surface comprises an inclined portion having a first included angle with the first direction and having a second include angle with the third direction, the collimating mirror is located on the inclined portion, the first included angle between the inclined portion and the first direction ranges from 17° to 29°, and the second included angle between the inclined portion and the third direction ranges from 17° to 29°.

* * * * *